(12) United States Patent
Frey et al.

(10) Patent No.: US 7,075,765 B2
(45) Date of Patent: Jul. 11, 2006

(54) POWER LIMITING CIRCUIT

(75) Inventors: Fritz Frey, Kunzelsau (DE); Jorg Stritzelberger, Ohringen-Cappel (DE)

(73) Assignee: R. Stahl Schaltgerate GmbH, Waldenburg (DE)

( * ) Notice: Subject to any disclaimer, the term of this patent is extended or adjusted under 35 U.S.C. 154(b) by 39 days.

(21) Appl. No.: 10/478,089

(22) PCT Filed: Apr. 23, 2002

(86) PCT No.: PCT/DE02/01479

§ 371 (c)(1),
(2), (4) Date: Apr. 26, 2004

(87) PCT Pub. No.: WO02/095895

PCT Pub. Date: Nov. 28, 2002

(65) Prior Publication Data

US 2004/0174648 A1     Sep. 9, 2004

(30) Foreign Application Priority Data

May 18, 2001  (DE) .................. 101 24 683

(51) Int. Cl.
*H02H 3/00* (2006.01)

(52) U.S. Cl. ..................................... 361/93.1
(58) Field of Classification Search ................ 361/93.1
See application file for complete search history.

(56) References Cited

U.S. PATENT DOCUMENTS

| | | |
|---|---|---|
| 3,878,434 A | 4/1975 | Voorhoeve |
| 4,412,265 A * | 10/1983 | Buuck ......................... 361/18 |
| 4,663,537 A * | 5/1987 | Goldner et al. ............ 307/10.1 |
| 4,763,069 A * | 8/1988 | Landrini ...................... 324/767 |
| 4,831,484 A | 5/1989 | Bruch |
| 5,144,517 A | 9/1992 | Wieth |
| 5,763,963 A * | 6/1998 | Zydek et al. ................ 307/130 |
| 2001/0029433 A1* | 10/2001 | Scott ............................. 702/58 |

* cited by examiner

*Primary Examiner*—Stephen W. Jackson
(74) *Attorney, Agent, or Firm*—Leydig, Voit & Mayer, Ltd

(57) ABSTRACT

A circuit arrangement includes a current measuring or temperature measuring device, used for triggering a shunt device. Said shunt device produces a short-circuit, which directly leads to the blowing of a fuse. The arrangement is modular and allows the operation of several current measuring devices on a common shunt device. Said arrangement is specifically adapted to prevent a protection resistor from warming up to too high a surface temperature in the case of an error, because the current is flowing for too much time.

26 Claims, 3 Drawing Sheets

POWER LIMITING CIRCUIT

FIELD OF THE INVENTION

The present invention relates generally to electrical safety circuits, and more particularly to power limiting circuits for preventing excessive current draw and overheating of circuit components due to power dissipation.

Electrical devices often have to be deployed in hazardous areas where potentially combustible gas is present, and measures have to be taken to prevent explosions. According to the specifications for explosion protection, an electrical load is deemed an "intrinsically safe load" the maximum current that this load can draw from the power source cannot exceed a certain limiting value. The maximum values of current and voltage depend on environmental conditions. In one case the maximum power value derived from these specifications is 40.29 W at 12.1 V and 3.33 A.

BACKGROUND OF THE INVENTION

The specifications assume that in the intrinsically safe device, short-circuit faults could occur, which could possibly lead to a greater current drain, causing the device to lose its property as intrinsically safe.

To ensure that such an operating state cannot occur due to a malfunction of components in the device, the specifications demand a current limiting resistor in the power supply line. In the short-circuit case, up to 36 W of power dissipation can appear across this current limiting resistor. The specifications require that under no circumstances may this 36 W cause the temperature on the surface of the resistor to go over 135° C. To ensure that this temperature requirement can be maintained under unfavorable conditions, protective resistors with large surfaces and correspondingly large physical sizes are needed. Also the device housing must be able to dissipate the maximum power dissipation of 36 W in the interior without unacceptable heating.

With today's demands for device miniaturization, the large size of the protective resistor has proven to be a significant obstacle to further size reduction. Ultimately, the current limiting resistor determines the volume of the housing based on the required maximum surface temperature.

The same issue exists likewise for simple safety barriers. A safety barrier is a protective circuit that absolutely ensures that power-carrying lines that exit the safety barrier and run into the hazardous zone cannot carry a current or voltage that exceeds the permissible values for intrinsically safe power circuits.

The simplest type for such safety barriers uses an ohmic resistor in the series branch of the power path, which, if the safety barrier is to be arranged in the hazardous zone, must meet the same safety requirements for intrinsically safe devices as explained above. Thus, the safety barrier typically provides additional protective circuits in order to prevent over-voltages.

OBJECTS AND SUMMARY OF THE INVENTION

In view of the foregoing, it is an object of the invention to provide a power limiting circuit that allows a resistor with a smaller cooling surface and thus with a smaller physical size to be used as the protective resistor that produces the current limiting effect.

This task is accomplished according to the invention by the circuit arrangement with the features of claim 1.

The power limiting circuit arrangement according to the invention has two series branches lying in the supply line to the corresponding load, with the protective resistor being included in one of the series branches. A sufficiently fast-acting current measurement device detects the current in one or both series branches and generates a signal, which is applied to a controllable shunt device between the two series branches. As soon as the shunt device is activated, it generates for a short time a low-dissipation current draw, which activates a non-linear currently limiting element. In the simplest case, this non-linear element is a safety fuse, which is blown due to the current draw generated by the shunt device. Alternatively, this element could also be a PTC resistor with a strongly non-linear characteristic curve, which abruptly enters the high-resistance state if the trigger-point temperature is exceeded, wherein the resulting low power dissipation keeps the resistor in the high-resistance state.

By means of the current measurement device in connection with the shunt device, a rapid shutdown or at least a strong reduction of the current in the series branch is provided, if the current strongly exceeds the limiting value or is in the limiting region over a long time.

This rapid shutdown or current reduction has the effect of preventing the surface of the protective resistor of the power limiting circuit from being overheated. As a result, the protective resistor can be dimensioned smaller correspondingly. It only has to ensure that the current measurement device and the shunt device become active just before the impermissible surface temperatures of the protective resistor are reached.

Advantageously, both the current measurement device and the shunt device preferably have redundant configurations, because they contain semiconductors that tend to have defects according to the assumptions of the specifications.

A very simple way to implement the current measurement device is to use at least one NTC (negative temperature coefficient) resistor, which is thermally coupled to the protective resistor. If the protective effect of the protective resistor is triggered and the resistor begins to heat up, the NTC resistor also begins to heat up. Just before the protective resistor reaches impermissible surface temperatures, the resistance of the NTC resistor becomes sufficiently small that it can trigger the shunt device.

The current measurement device may also be implemented using a current sensor resistor in one of the two series branches. The current sensor resistor can have a very low resistance, so that under no circumstances does it dissipate a large amount of power. The current value measured at this point is used as an input to the control circuit, which generates from this value the control signal for the shunt device. The current measurement device can have at least one controlled semiconductor device, preferably a transistor, whose control segment is connected in parallel to the current sensor resistor, for detecting the voltage drop across the resistor.

Another implementation lays the main segment of a circuit that operates as a type of parallel regulator parallel to this current sensor resistor.

If the voltage appearing across the current sensor resistor is too small to generate the control or power supply current for the shunt device, the control voltage for the shunt device can be formed by combining the voltage drop across the current sensor resistor with a constant voltage. The constant voltage can be obtained with the help of a Zener diode or a comparable integrated circuit from the voltage between the two series branches.

The power limiting circuit arrangement according to the invention can be used both on the power supply side of intrinsically safe devices and also as a stand-alone safety barrier. In addition, it permits the new circuit to be used to build a "multi-channel" safety barrier. For this purpose, the shunt device is only provided once, while on the "output side" the series branch forks or splits into a corresponding number of parallel series branches, with another current measurement device being allocated for each pair of additional series branches. Here, for instance, a bus-rail type power supply can be created, which has a shunt device on the side of the power supply and goes out by a selected number of power supply paths to the corresponding devices. Thus, each power supply path contains its own current measurement device, with all the current measurement devices switched in parallel and acting in common on the one shunt device. If a dangerous condition appears in only one of the power supply paths, the shunt device is activated and all commonly powered current paths are turned off.

Other objects and advantages of the invention will become apparent upon reading the following detailed description and upon reference to the drawings, in which:

DETAILED DESCRIPTION OF THE PREFERRED EMBODIMENT

Figure 1:
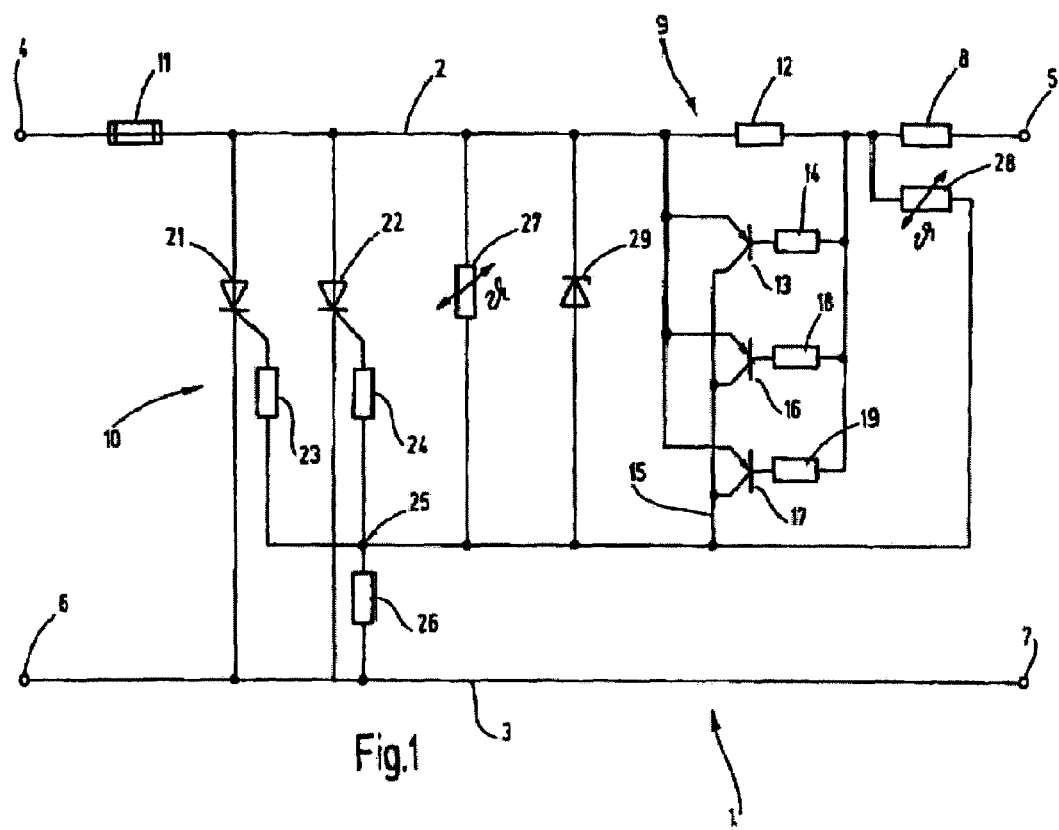
FIG. 1 is a schematic circuit diagram showing an embodiment of a power limiting circuit for providing intrinsic safety of electrical power supply in accordance with the invention.

FIG. 1 shows a circuit arrangement 1, as it can be arranged, e.g., in the power supply line to an intrinsically safe device. The protective circuit 1 has a first and a second series branch 2, 3, each of which galvanically connects, respectively, a first input point 4 to a first output point 5 and a second input point 6 to a second output point 7. A load is attached to the output points 5 and 7. In the series branch 2, there is a protective resistor 8, which is required according to the specifications of explosion protection for the "intrinsically safe" type of protection. The resistor 8 should limit the current in the series branch 2 and thus also in the series branch 3 to typical, intrinsically safe values if a short circuit occurs between the output points 5 and 7, i.e., on the sides of the load, which is attached to the output points 5 and 7.

In the failure case, a power dissipation of ca. 36 W appears on the protective resistor 8, which must be converted into heat. Here, the surface temperature of the resistor may not exceed 135° C.

This surface temperature is not reached instantaneously because the protective resistor 8 exhibits a certain thermal inertia due to its structural size and surface and also the materials that are used. By dimensioning the protective resistor 8 appropriately, the surface temperature can always remain below the acceptable limiting value. However, such dimensioning leads to a mechanically very large protective resistor 8.

The mechanical size of the protective resistor 8 can be reduced if the current is directed into the two series branches 2, 3 in the fault case in order to turn off the current to the load just before the protective resistor 8 heats up to an impermissible degree. For this purpose, the protective circuit contains a current measurement device 9, which detects the current in the series branch 2 and thus to the load, as well as a shunt device 10, which leads to the current to the load being shut off in connection with a fuse 11.

A current sensor resistor 12, which lies in the series branch 2 between the fuse 11 and the protective resistor 8, belongs to the current measurement device 9. Its resistance is small relative to the value of the protective resistor 8. The voltage drop across the current measurement resistor 12 is detected with the help of a bipolar transistor 13, whose emitter is connected to the end of the resistor 12 facing the node 4 and whose base is connected via a decoupling resistor 14 to the node between the protective resistor 8 and the current sensor resistor 12. The collector of the transistor 13 forms a signal output 15 of the current measurement device 9. Instead of the ohmic resistor, a non-linear resistor can also be used as the current measurement resistor 12. This can be formed by a diode poled in the direction of throughput, if only a very small current is drawn off as a rule at the output points 5, 7.

The current measurement device 9 has a redundant configuration and contains additional bipolar transistors 16 and 17, whose emitters are connected together galvanically to the emitter of the transistor 13. The collectors of the transistors 16 and 17 are likewise attached to the signal output 15. The bases of the transistors 16 and 17 are each connected via separate decoupling resistors 18 and 19 to the node between the current sensor resistor 12 and the protective resistor 8.

The shunt device 10 likewise has a redundant configuration and contains two thyristors 21 and 22 connected in parallel, whose anodes are connected as shown to the series branch 2 and whose cathodes are connected to the series branch 3. The control electrodes of the thyristors 21 and 22 are each connected via separate decoupling resistors 23 and 24 to the signal output 15. The node between the cold ends of the two resistors 23 and 24 forms, so to speak, a control input 25 of the shunt device 11 [sic; 10].

Finally, for discharging unavoidable leakage currents, there is a discharge resistor 26, which connects the control input 25 to the series branch 3 at a high resistance.

To increase the safety of the entire arrangement, there is an NTC resistor 27, which connects the control input 25 to the series branch 2. Another NTC resistor 28, which is connected in parallel to the NTC resistor 27, is thermally coupled to the protective resistor 8 and directly measures its surface temperature, while the NTC resistor 27 detects the ambient temperature.

Finally, a Zener diode 29 is provided, which lies between the series branch 2 and the control input 25 and which ensures that the voltage between the series branches 2 and 3 cannot exceed a predetermined limit.

Based on its function, the signals supplied by the current measurement device 9, the NTC resistors 27 and 28, and the Zener diode 29 are OR-gated to the control input 25, i.e., to trigger the shunt device 10, it is sufficient if one of the signals exceeds a permissible limit.

To explain the function, it is assumed that a power source is attached to the input points 4 and 6, while the output points 5 and 7 are connected to an arbitrary load. From the viewpoint of the nodes 4 and 6, the arrangement should be intrinsically safe in the sense of the specifications of explosion protection.

As long as no short circuit appears on the load side, the current flows over the two series branches 2 and 3 to the load and then back from the load, respectively. Here, a small voltage drop results across the current measurement resistor 12 and the protective resistor 8. The voltage drop across the protective resistor 8 is too small in normal operation for significant power dissipation, which would lead to unacceptable heating, to appear there.

The voltage drop across the current sensor resistor 12 is smaller than that corresponding to the threshold voltage of the PN junction of the transistors 13, 16, and 17. These transistors 13, 16, 17 remain blocked.

The voltage between the two series branches 2 and 3 is smaller than the Z voltage 29, so that this also remains blocked. The temperatures are low, which means the NTC resistors 27 and 28 each remain at a high resistance. Consequently, there is also no current in the discharge resistor 26, which could lead to a voltage drop, which would be over the gate trigger voltage of the thyristors 21 or 22.

If a short circuit appears in the load, which leads to a large current in the series branch 2, the limiting effect by the protective resistor 8 is activated. Simultaneously, the voltage drop across the current measurement resistor 12 increases. The voltage drop reaches values that can make at least one of the transistors 13, 16, and 17 conductive. Therefore, the transistors become low resistance and the potential on the control input 25 shifts to the value on the series branch 2 minus the saturation voltage of the transistors 13, 16, and 17. In each case, the voltage is sufficient to trigger the thyristors 21 and 22 via the protective resistors 23 and 24. Because the thyristors 21 and 22 are attached directly to the cold side of the fuse 11, a current, which immediately burns through the fuse 11, is produced through the fuse 11. Thus, within a short time, the load carries no current.

The two resistors 8 and 12 lie beyond the circuit formed by the fuse 11 and the thyristors 21 and 22. Thus, these two resistors 8 and 12 have no effect on the current flowing through the thyristors 21, 22 and also through the fuse 11.

The current measurement device 9 reacts very quickly and thus, in connection with the thyristors 21 and 22, it can completely turn off the current path within a very short time after the appearance of the limit current.

The transistors 13, 16, and 17 are connected in parallel to each other both on the input side and also on the output side, which produces the redundancy mentioned above. If one of the transistors can no longer be set into the conductive state because of a fault, the remaining, still functional transistors can generate the necessary current for triggering the thyristors 21, 22.

The resistors 14, 18, and 19 should prevent a feedback effect on the function of the remaining transistors 13, 16, 17, if the base-emitter path on one of the transistors 13, 16, 17 breaks down. Without the decoupling resistor 14, 18, or 19, this failure would lead to a short circuit of the current sensor resistor 12. Also, the functional transistors would no longer receive a control signal.

For the shown circuit arrangement 1, if none of the transistors 13, 16, or 17 reacts, e.g., because the current sensor resistor 12 is defective, the protective resistor 8 heats up. The temperature of the protective resistor 8 is measured by the thermally coupled NTC resistor 28. At a sufficient distance below the impermissible surface temperature, the resistance of the NTC resistor 28 decreases to a value that generates a current to trigger the thyristors 21, 22.

With the help of the NTC resistor 28, failure states, for which impermissible surface temperatures could be achieved due to a very small dimensioning of the protective resistor 8, can also be detected before the voltage drop across the current sensor resistor 12 is sufficient to control one or more of the transistors 13, 16, or 17. Thus, the NTC resistor 28 would react to a long-lasting slight overload, while the current sensor device 9 reacts quickly to a very large overload.

The NTC resistor 27 monitors the general ambient temperature and provides a turn off if the ambient temperature has risen so far that ordinary cooling of the components is no longer guaranteed.

The Zener diode 29 monitors the voltage between the two series branches 2 and 3. As soon as the voltage exceeds an impermissible value, the Zener diode 29 becomes conductive and delivers a gate trigger current for the two thyristors 21 and 22.

The circuit arrangement shown in FIG. 1 is suitable not only as a component of intrinsically safe circuit devices, but also as a circuit for a safety barrier. In addition, on the basis of this basic circuit, a multi-channel safety barrier can be built, as shown schematically in FIG. 2.

Figure 2:
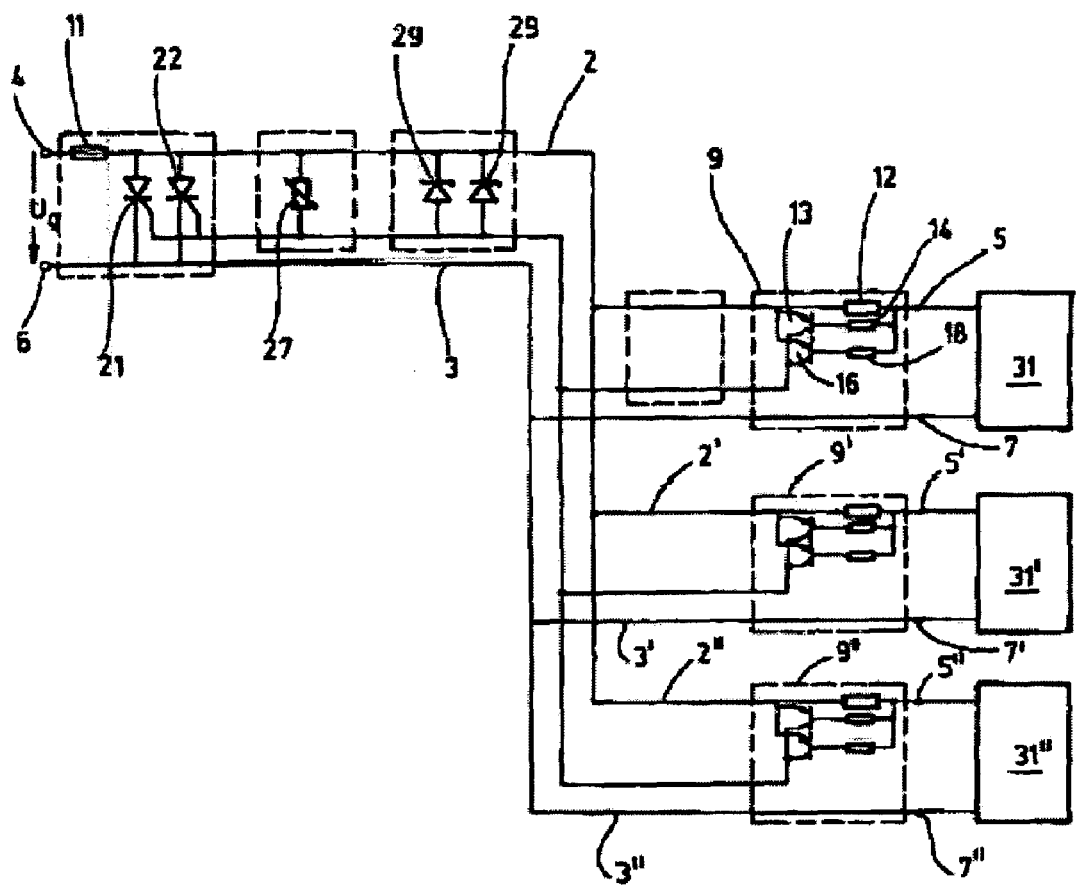
FIG. 2 is a schematic circuit diagram showing a multi-channel configuration of the power limiting circuit.

The difference between the circuit arrangement from FIG. 2 and the arrangement from FIG. 1 primarily concerns the lack of the protective resistor 8. Limiting the current to values required according to the specifications of intrinsic safety happens exclusively with the help of the current monitoring device 9 in connection with the current sensor resistor 12. In general, the circuit from FIG. 2 contains the circuit from FIG. 1 completely, whereby the same reference numbers are used for repeating components. The change of the circuit in the direction towards a multi-channel safety barrier consists in the connection of additional branch lines 2' and 2" or 3' and 3", which branch off from the two series branches 2 and 3. In an electrical sense, the branching point lies on the cold side behind the Zener diode 29. The Zener diode likewise has a redundant configuration in the case of the arrangement from FIG. 2, i.e., there is another Zener diode 29'.

Because the branch lines 2' . . . 3" branch between the current measurement device 9 and the Zener diode 29, the monitoring functions by the Zener diodes 29 and 29', the NTC resistor 27, and also the shunt device 10 are the same for all circuit parts lying to the right from this point. The branch lines 2' . . . 3" are, so to speak, extensions of the series branches 2 and 3 leading in the direction of the load up to the Zener diode 29.

Between the branch lines 2' . . . 3" there are corresponding current measurement devices 9' and 9", which are configured in the same way as the current monitoring device 9, whose function is explained in more detail above in connection with FIG. 1.

Because the monitoring device 9 behaves like an open-collector circuit at its output 15, it can be connected at the control input 25 to other similarly configured circuits, wherein the above mentioned OR linking is used. Thus, for each channel of the circuit arrangement shown in FIG. 2, the current to a load is monitored individually, as indicated by 31, 31', 31". If a fault produces power consumption to a degree that is greater than that permissible according to explosion-protection specifications for the intrinsically safe type of protection, transistors 13, 16 contained in the affected current measurement device 9 become conductive and trigger the thyristors 21 and 22, which are common for all channels. Therefore, all loads attached to the multi-channel safety barrier, thus also those operating fault-free, are turned off.

Figure 3:
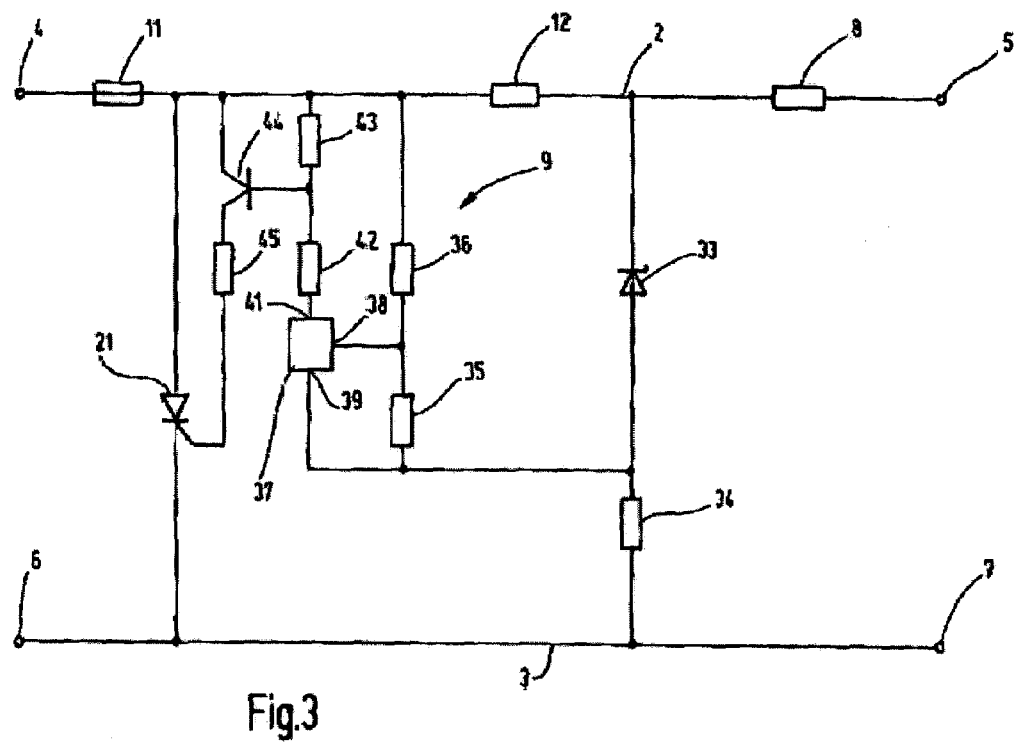
FIG. 3 is a schematic circuit diagram showing another embodiment of the power limiting circuit in accordance with the invention.

FIG. 3 shows the principle circuit diagram for an arrangement featuring a precise switching threshold. The switching threshold, for which the shunt device 10 from FIG. 1 is triggered, depends on the component tolerances of the transistors 13, 16, and 17. On top of everything, the characteristic curve is relatively flat because the amplification is relatively small. A higher switching accuracy can be achieved if the voltage on the current sensor resistor 12 is detected not only with the help of a single transistor, but also with the help of an integrated circuit exhibiting the characteristics of a Zener diode. An integrated circuit that is suitable for this purpose is available under the model designation TL-431 from Motorola.

A series circuit consisting of a Zener diode 33 and a limiting resistor 34 leads from the node between the current sensor resistor 12 and the protective resistor 8 to the other series branch 3. In parallel with the series circuit to the Zener diode 33 and the current sensor resistor 12, there is an ohmic voltage divider consisting of two resistors 35 and 36. In parallel with the resistor 35, there is the control path of an integrated circuit 37 with higher amplification and a sharp turn in the characteristic curve. Its control input 38 is attached to the node between the resistor 35 and the resistor 36, while the common low point 39 is connected to the resistor 34.

A third connection 41 is connected via the series circuit of two resistors 42 and 43 to the series branch 2 between the fuse 11 and the current sensor resistor 12. The integrated circuit 37 behaves like a threshold switch between the two connections 39 and 41. Below a predetermined threshold, the path between the connections 41 and 39 has a high resistance. No current flows through the resistors 42 and 43.

For power amplification, a bipolar transistor 44 is used, whose emitter lies on the series branch 2, and between the fuse 11 and the current measurement device 12. The base is connected to the node between the resistors 42 and 43, while the collector lies on the trigger electrode of the thyristor 21 via a decoupling and protective resistor 45.

The circuit arrangement from FIG. 3 operates in the following way:

The operating voltage for the integrated circuit 37, which exhibits the characteristics of a threshold switch, is generated with the help of the Zener diode 33, to which the voltage drop across the current sensor resistor 12 is added.

The voltage drop across the current sensor resistor 12 changes depending on the current to the load, which is considered attached to the output points 5 and 7. As long as the current to the load remains below dangerous values, the sum of the voltage drop across the current sensor resistor 12 and the Zener diode 33 is too small to generate a voltage, which would be greater than that voltage necessary to change the integrated circuit 37 between the connections 39 and 41 into the conductive state, on the input 38 by means of the voltage divider consisting of the resistors 35 and 36. Therefore, the voltage component from the resistors 42 and 43 remains without current and the transistor 44 is blocked.

If the current through the current sensor resistor 12 rises, the sum from this voltage and the voltage drop across the Zener diode 33 increases correspondingly. When a certain value is reached, the voltage on the resistor 35 consequently also rises over the reference value, after which the integrated circuit 37 becomes conductive. This change-over occurs due to the high inner amplification of the integrated circuit 37 with a sharp bend, so that the current through the resistors 43 and 42 is turned on abruptly correspondingly, with the result that the transistor 44 is also set. Thus it delivers the gate trigger current for the thyristor 21 over its base-emitter path.

Figure 4:
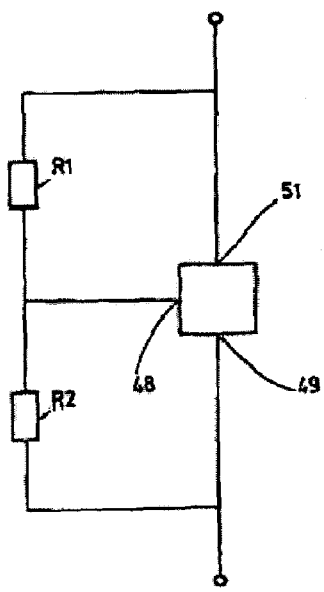
FIG. 4 is a schematic circuit diagram showing the use of an integrated circuit for replacing a Zener diode circuit in the circuit of FIG. 3.

If the approximately flat characteristic curve of the Zener diode 33 or its temperature path changes, the circuit from FIG. 4 can also be used as a Zener diode replacement. Here, the integrated circuit ZHT-431, which is connected in parallel with two resistors R1 and R2, can be used. R2 lies between the control input 48 and a ground connection 49, which simultaneously corresponds to the anode of the modified Zener diode. The second power input 51 is also connected to the control input 48 via the resistor R1. The power connection 51 corresponds to the cathode of a Zener diode.

The voltage between the two connections 51 and 49 satisfies the following equation:

$$V_z = (1 + R1/R2) \times Vref$$

One circuit arrangement has a current or temperature measurement device, which is used to trigger a shunt device. The shunt device generates a short circuit, which leads directly to the burn-through of a fuse.

The arrangement is modular and permits several current measurement devices to be operated on a common shunt device. In particular, in the fault case the arrangement prevents a protective resistor from heating up to high surface temperatures due to the current flowing over too long a time.

The invention claimed is:

1. A safety circuit for current limiting in a supply line to a current load (31), comprising:
    a first series branch (2, 3) galvanically connecting a first input point (4, 6) to a first output point (5, 7), and a second series branch (2, 3) galvanically connecting a second input point (4, 6) to a second output point (5, 7);
    a current limiting resistor (8) in at least one of the first and second series branches (2, 3);
    a current measurement device (9) connected to detect a current in at least one of the series branches (2, 3), the current measurement device having at least one signal output (15);
    a shunt device (10) attached to a side of the current limiting resistor (8) adjacent to the input point (4, 6) and having a control input (25) attached to the signal output (15) of the current measurement device (9), the shunt device being connected for shunting current between said first and second series branches (2, 3); and
    a non-linear element (11) disposed between one of the input points (4, 6) and the shunt device (10) and having low resistance below a current limiting value and a high resistance when the current limiting value is exceeded.

2. A safety circuit according to claim 1, wherein the current limiting resistor (8) is an ohmic resistor.

3. A safety circuit according to claim 1, wherein only one of the series branches (2, 3) contains the current limiting resistor (8).

4. A safety circuit according to claim 1, wherein the current measurement device (9) has a redundant configuration.

5. A safety circuit according to claim 1, wherein the current measurement device (9) includes a temperature-dependent resistor (28) thermally coupled to the current limiting resistor (8) and connecting the control input (25) to one of the series branches (2, 3).

6. A safety circuit according to claim 1, including a temperature measurement device (28, 27) connecting one of the series branches (2, 3) to the control input (25).

7. A safety circuit according to claim 6, wherein the temperature measurement device (27, 28) has a redundant configuration.

8. A safety circuit according to claim 1, wherein the current measurement device (9) includes a current measurement resistor (12) in one of the series branches (2, 3).

9. A safety circuit according to claim 8, further including an evaluation circuit (13, 16, 17, 37) for monitoring a voltage drop across the current measurement resistor (8), the evaluation circuit having a signal output (15) that forms the signal output (25) of the current measurement device (9).

10. A safety circuit according to claim 8, wherein the current measurement device (9) has at least one transistor (13, 16, 17) having a control path parallel to the current measurement resistor (12) and a main electrode forming the signal output (15).

11. A safety circuit according to claim 1, including a voltage monitoring device (29) for detecting a voltage difference between the two series branches (2,3), the monitoring device having a signal output connected to the control input (25) of the shunt device (10).

12. A safety circuit according to claim 11, wherein the voltage monitoring circuit (29) has a redundant configuration.

13. A safety circuit according to claim 10, wherein the voltage monitoring device (29) is formed by at least one Zener diode, via which one of the series branches (2, 3) is connected to the control input (25).

14. A safety circuit according to claim 1, wherein the shunt device (10) has a redundant configuration.

15. A safety circuit according to claim 1, wherein the shunt device (10) has at least one controlled semiconductor device (21, 22) having a control input connected to the control input (25) of the shunt device (10).

16. A safety circuit according to claim 1, wherein the controlled semiconductor device (21, 22) is formed by a thyristor, a triac, or a transistor.

17. A safety circuit according to claim 1, wherein the shunt device (10) has a protective circuit (23, 24) on its control input.

18. A safety circuit according to claim 17, wherein the protective circuit (23, 24) is formed by ohmic resistors.

19. A safety circuit according to claim 1, wherein the non-linear element is formed by a fuse (11).

20. A safety circuit according to claim 1, including at least a third and a fourth series branches (2' ... 3") branching off from the first and the second series branches (2, 3), wherein branching points of the third and fourth series branches (2', 3") each lies on a side of the shunt device (10) adjacent to the output points (5, 7).

21. A safety circuit according to claim 20, wherein the branching points each lies between the shunt device (10) and the current measurement device (9) for the first and the second series branch (2, 3).

22. A safety circuit according to claim 20, wherein the third and the fourth series branches (2' ... 3") are provided with a separate current measurement device (9', 9") having a signal output (15) connected to the control input (25) of the shunt device (10), such that the current measurement devices (9) are connected in parallel on the output side.

23. A safety circuit according to claim 1, wherein the current measurement device (9) contains a threshold switch (37).

24. A safety circuit according to claim 1, wherein said safety circuit forms a safety barrier.

25. A safety circuit according to claim 1, wherein the shunt device (10) is arranged spatially offset from the current measurement device(s) (9).

26. A safety circuit according to claim 1, wherein the current limiting resistor imposes a current limit required according to specifications for a power supply line of an intrinsically safe device.

* * * * *